Dec. 25, 1956 A. J. McMASTER ET AL 2,775,075

KNIFE SHARPENER

Filed Feb. 9, 1951 6 Sheets-Sheet 1

INVENTOR.
Archie J. McMaster
William H. Kitto
BY
McLaughlin & Wallenstein
Attys.

INVENTORS
Archie J. McMaster
William H. Kitto
BY McLaughlin & Wallenstein
Attys.

Dec. 25, 1956 A. J. McMASTER ET AL 2,775,075

KNIFE SHARPENER

Filed Feb. 9, 1951 6 Sheets-Sheet 3

INVENTORS
Archie J. McMaster
William H. Kitto
BY
McLaughlin & Wallenstein
Attys.

Dec. 25, 1956 A. J. McMASTER ET AL 2,775,075

KNIFE SHARPENER

Filed Feb. 9, 1951 6 Sheets-Sheet 4

INVENTORS.
Archie J. McMaster
William H. Kitto
By: Wallenstein & Spangenberg
Attys.

KNIFE SHARPENER

Filed Feb. 9, 1951 6 Sheets-Sheet 5

INVENTORS.

Archie J. McMaster
William H. Kitto
By: Wallenstein & Spangenberg
Attys.

KNIFE SHARPENER

Filed Feb. 9, 1951

INVENTORS.
Archie J. McMaster
William H. Kitto
By: Wallenstein & Spangenberg
Attys

United States Patent Office 2,775,075

Patented Dec. 25, 1956

2,775,075

KNIFE SHARPENER

Archie J. McMaster, Deerfield, and William H. Kitto, Evanston, Ill., assignors to G-M Laboratories, Inc., Chicago, Ill., a corporation of Illinois Application February 9, 1951, Serial No. 210,158

4 Claims. (Cl. 51—128)

This invention relates to sharpening devices such as for knives and the like. This application is a continuation-in-part of our copending application Ser. No. 36,044, filed June 30, 1948, now abandoned.

The principal object of this invention is to provide an improved motor driven knife sharpener which accurately and quickly sharpens knives without burning or pitting the knife blade even when used by the uninitiated, which reduces accident hazards to a minimum, which is suitable for home use by inexperienced operators, which is readily and conveniently manipulated and operated, which is relatively simple in construction, and which is relatively inexpensive to manufacture.

In carrying out this object of the invention the knife sharpener preferably includes a bottom plate, an electric motor secured to the bottom plate and having a shaft extending longitudinally therefrom, and an abrasive wheel carried on one end of the shaft. A housing open at its bottom and having a top opening near one end is secured to the bottom plate with the abrasive wheel disposed in the top opening in the housing.

The abrasive wheel preferably has bevelled side portions and the housing is provided with guide surfaces on opposite sides of the top opening thereof parallel to and inclined from the bevelled side portions of the abrasive wheel. When the knife blade is held flat against the guide surfaces it is properly directed against the bevelled side portions of the abrasive wheel for accurately and quickly sharpening the same. Both sides of the knife blade may be sharpened from the same operating position. Spring clips may be utilized for maintaining the knife blade flat against the guide surfaces and stop members may be provided for limiting bending of the spring clips away from the guide surfaces. The guide surfaces may be fixed or integral with the housing or they may be adjustable with respect thereto for accurately aligning the same with respect to the abrasive wheel.

The electric motor is preferably a relatively high and constant speed motor of relatively low horsepower. The diameter of the abrasive wheel is so correlated with the motor that the lineal grinding speed of the abrasive wheel is such as to sharpen the knife at the proper rate. If excess pressure is applied to the knife during sharpening, the motor stalls thereby preventing burning or pitting of the knife blade. Likewise, if the exposed portion of the abrasive wheel is accidentally touched by the hand of the operator, the motor stalls before any appreciable injury is sustained.

The housing is also preferably provided with a second top opening near the center thereof, this opening overlying a switch means for the motor. A switch plate movably mounted in this opening closes the switch means when the switch plate is depressed. Thus, for example, the knife sharpener may be grasped with the left hand and the switch plate manipulated with that same hand, while the knife is manipulated with the right hand against the abrasive wheel for sharpening both sides of the knife. The knife is properly guided during this sharpening operation and foolproof operation, even by the uninitiated, is assured.

Novel means are also provided for accurately centering and mounting the abrasive wheel on the motor shaft further to assure accurate and quick sharpening of knives.

The end of the housing, opposite from the end receiving the abrasive wheel, preferably overhangs the bottom plate and provides a readily accessible compartment in the housing for storing the electric cord of the knife sharpener when not in use. The end of the motor shaft, opposite to that carrying the abrasive wheel, carries a fan for circulating air over the motor for cooling the same. In this connection, a partition is located within the housing adjacent the cord compartment. The partition is apertured so that air is drawn through the open bottom cord compartment by the fan into the motor compartment for cooling the motor. A baffle may be provided between the fan and motor for directing the cooling air onto the motor winding.

A partition is also preferably provided in the housing between the motor and the abrasive wheel to form an abrasive wheel compartment adjacent the motor compartment, this partition effectively preventing abrasive material in the abrasive wheel compartment from getting into the motor in the motor compartment. This partition may be a solid partition for isolating the abrasive wheel compartment from the motor compartment. In this event the top of the housing may be provided with a grill communicating with the motor compartment for discharging cooling air from the motor compartment. On the other hand, this partition may be a partial partition in the lower part of the housing and, in this event, the cooling air is discharged from the motor compartment over the partial partition into the abrasive wheel compartment and then out through the top opening in the housing about the abrasive wheel. The discharge of air over the partial partition effectively prevents abrasive material from entering the motor compartment from the abrasive wheel compartment.

The lower edge of the housing commensurate with the bottom plate is preferably provided with a beaded portion and a rubber strip is carried by the beaded portion and the bottom plate to form a base for the knife sharpener and to seal the joint between the housing and the bottom plate.

The motor is provided with a suitable frame by which it is mounted on the bottom plate. The top of this frame may carry an insulating plate on which is mounted the motor controlling switch means. The switch plate movably mounted in a top opening in the housing operates, when depressed, to close the switch means.

Further objects of this invention reside in the details of construction of the knife sharpener and the cooperative relationship between the component parts thereof.

Other objects and advantages of this invention will become apparent to those skilled in the art upon reference to the accompanying specification, claims and drawings, in which—

Fig. 6 is a sectional view taken on the line 6—6 of

Figures 1, 2, 3:
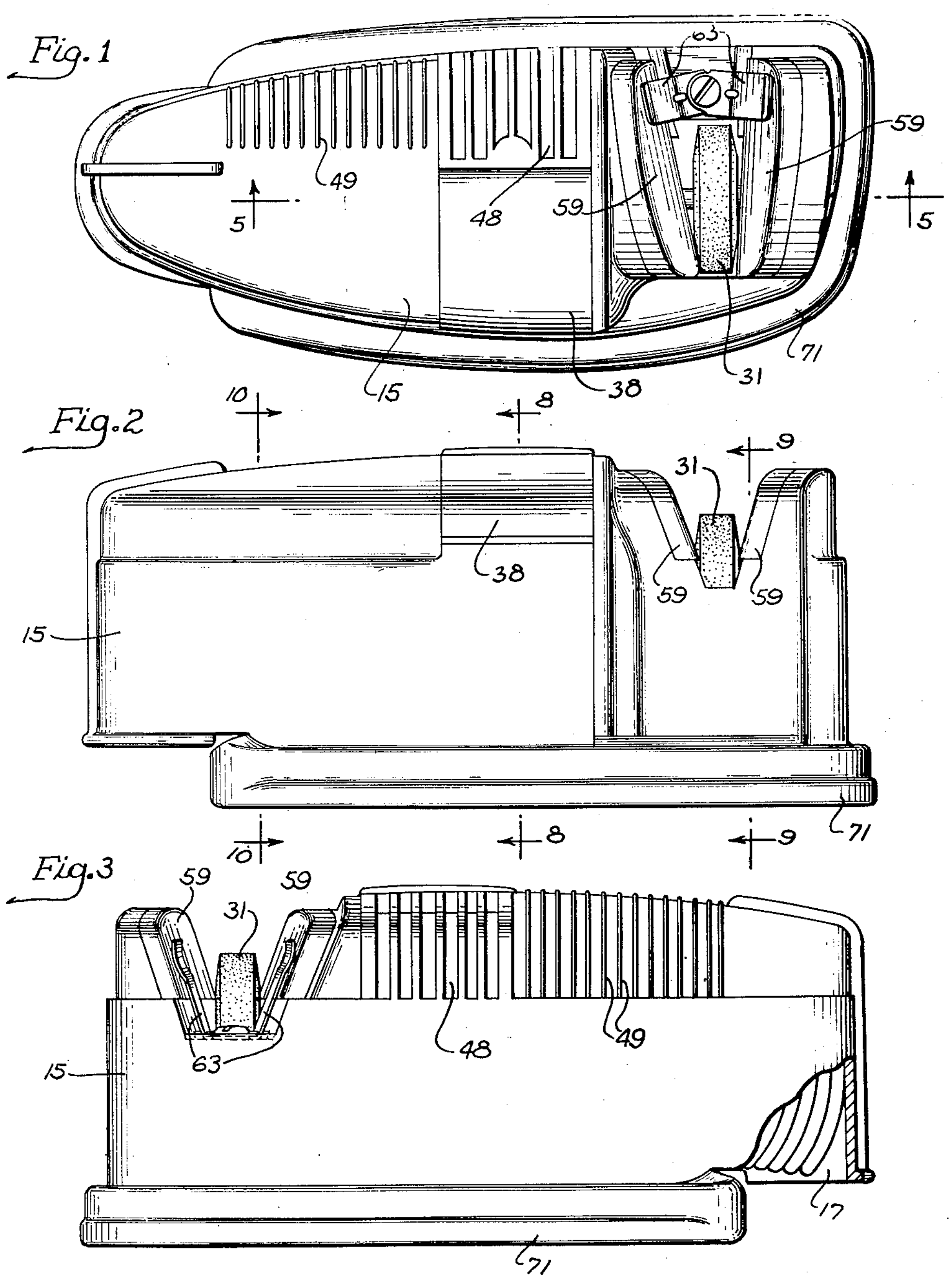
Fig. 1 is a plan view of one form of the knife sharpener.
Fig. 2 is an elevational view looking from the front position where an operator stands in the act of sharpening a knife.
Fig. 3 is a rear elevational view with a portion of the housing broken away to show the manner of storing the usual extension cord.
Figure 7:
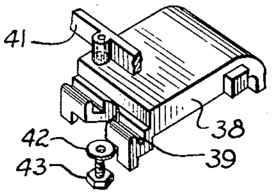
Figure 4:
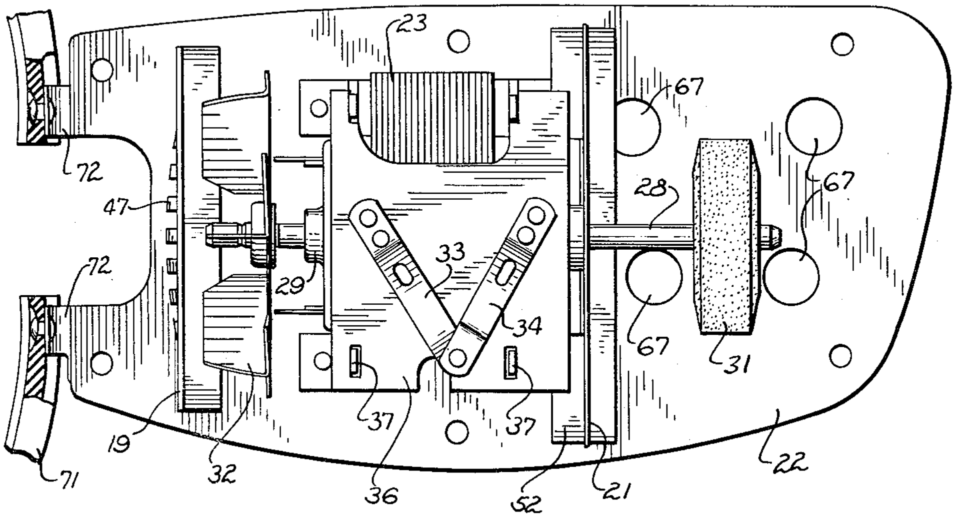
Fig. 4 is a plan view of the bottom plate with the apparatus attached thereto as it appears when removed from the housing, a rubber strip on which the device rests being broken away to conserve space.
Figure 5:
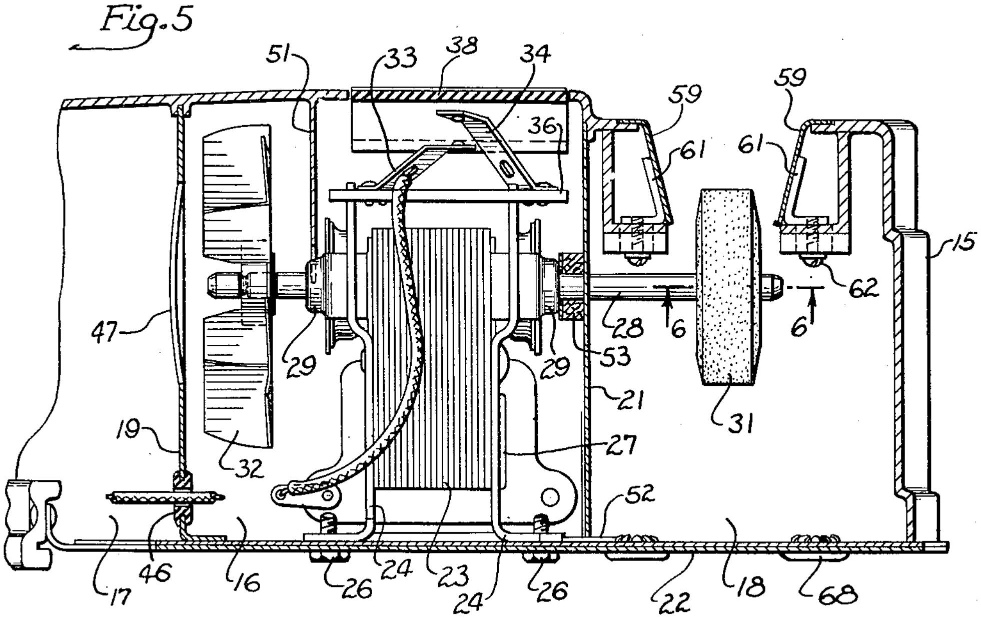
Fig. 5 is a fragmentary, longitudinal, vertical, sectional view taken on the line 5—5 of Fig. 1.
Figure 8:
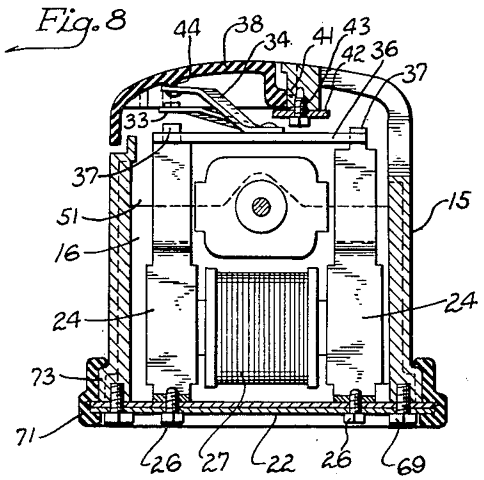
Figure 9:
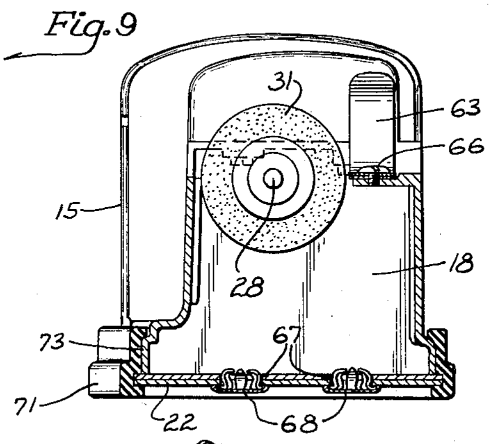
Figure 10:
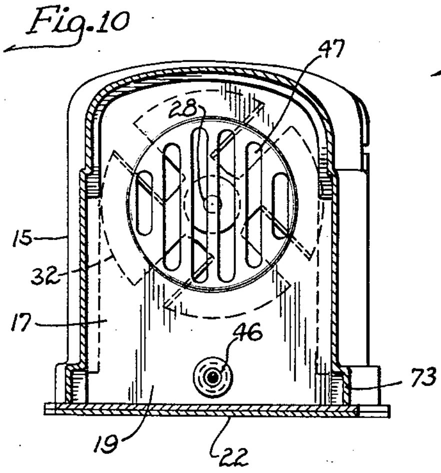
Figure 11:
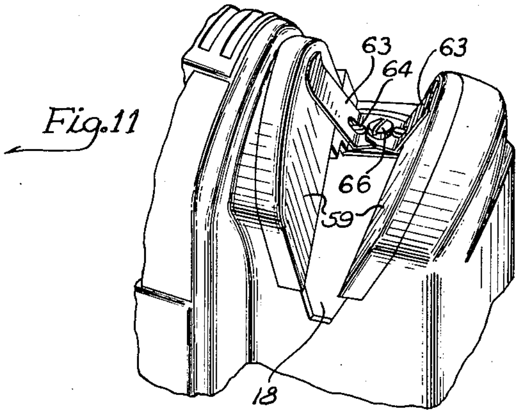
Figure 12:
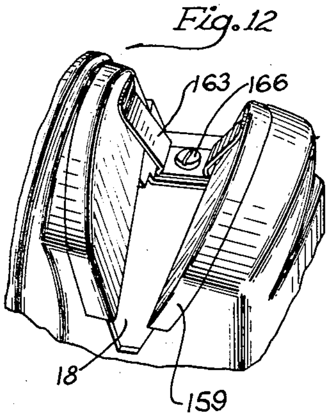
Figure 13:
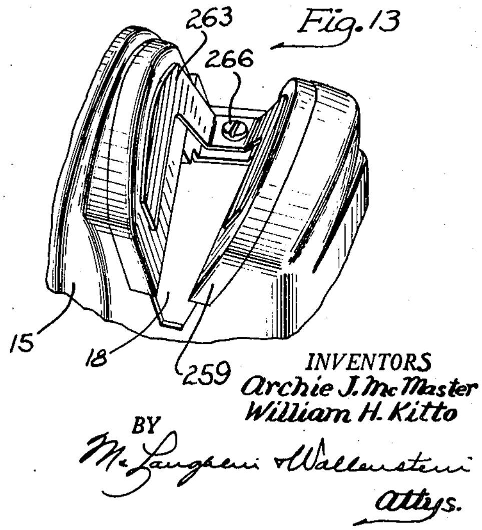
Figure 14:
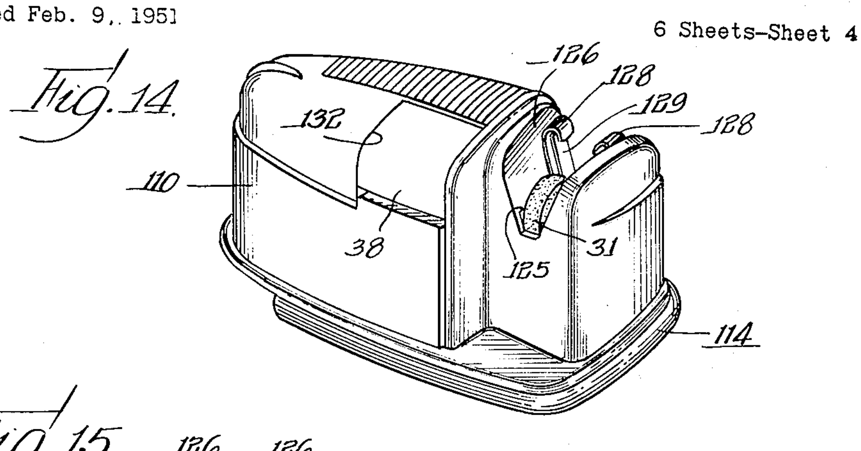
Figure 15:
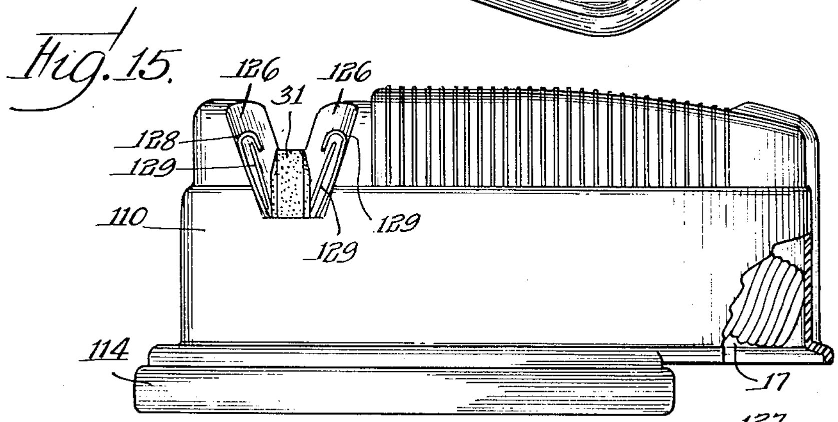
Figures 16, 17, 18:
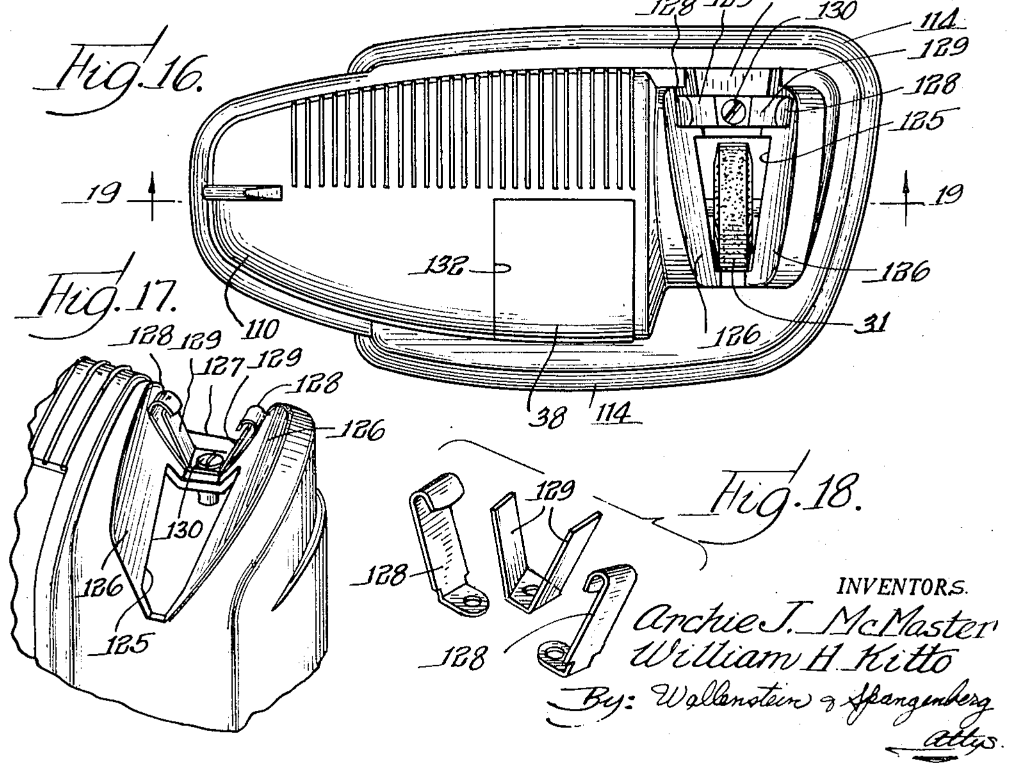
Figure 19:
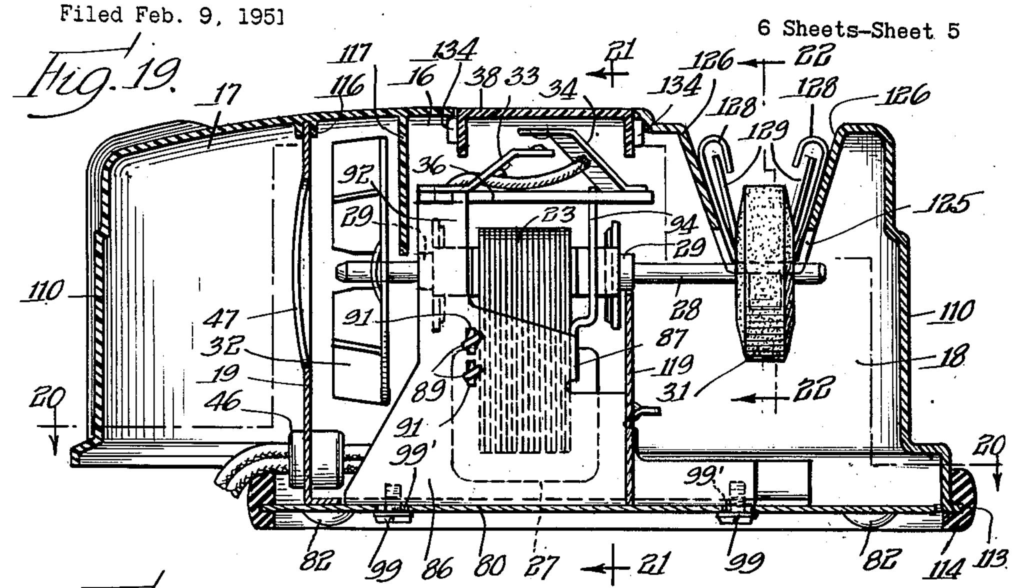
Figures 20, 21, 22:
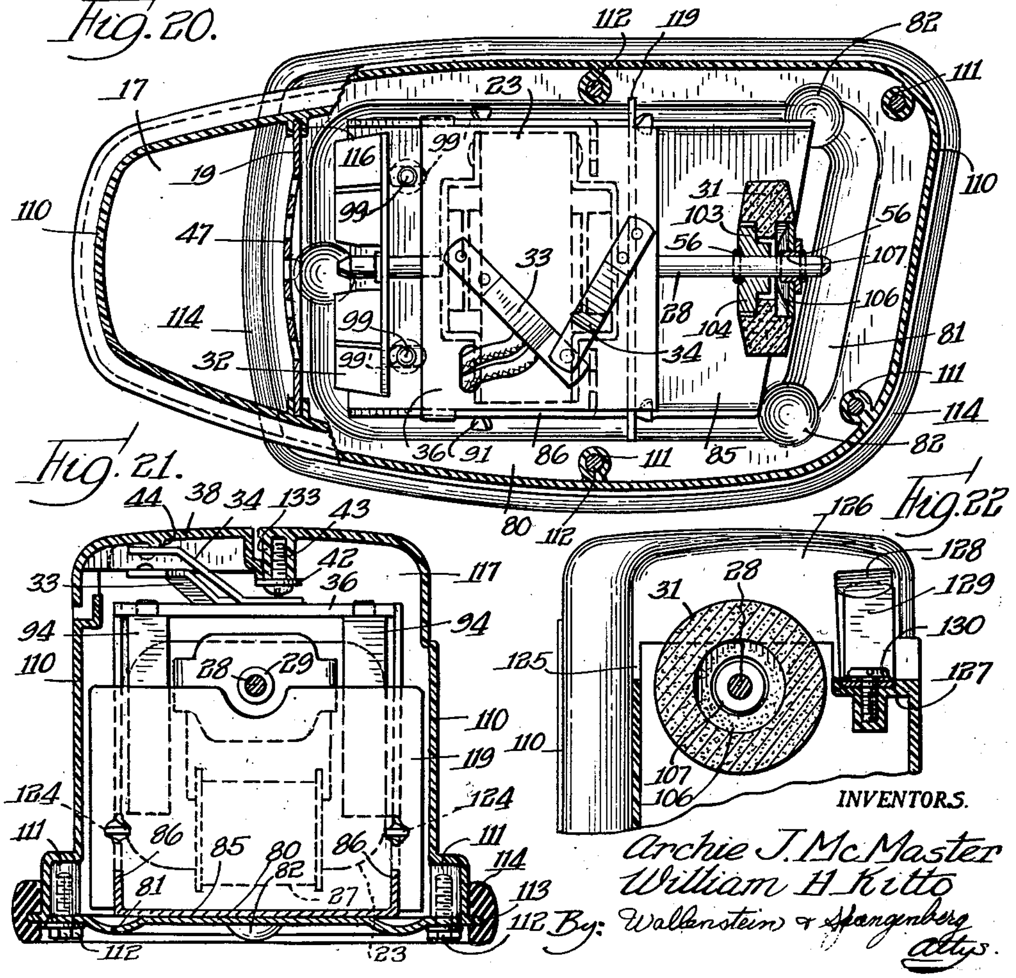
Figures 23, 24, 25, 26:
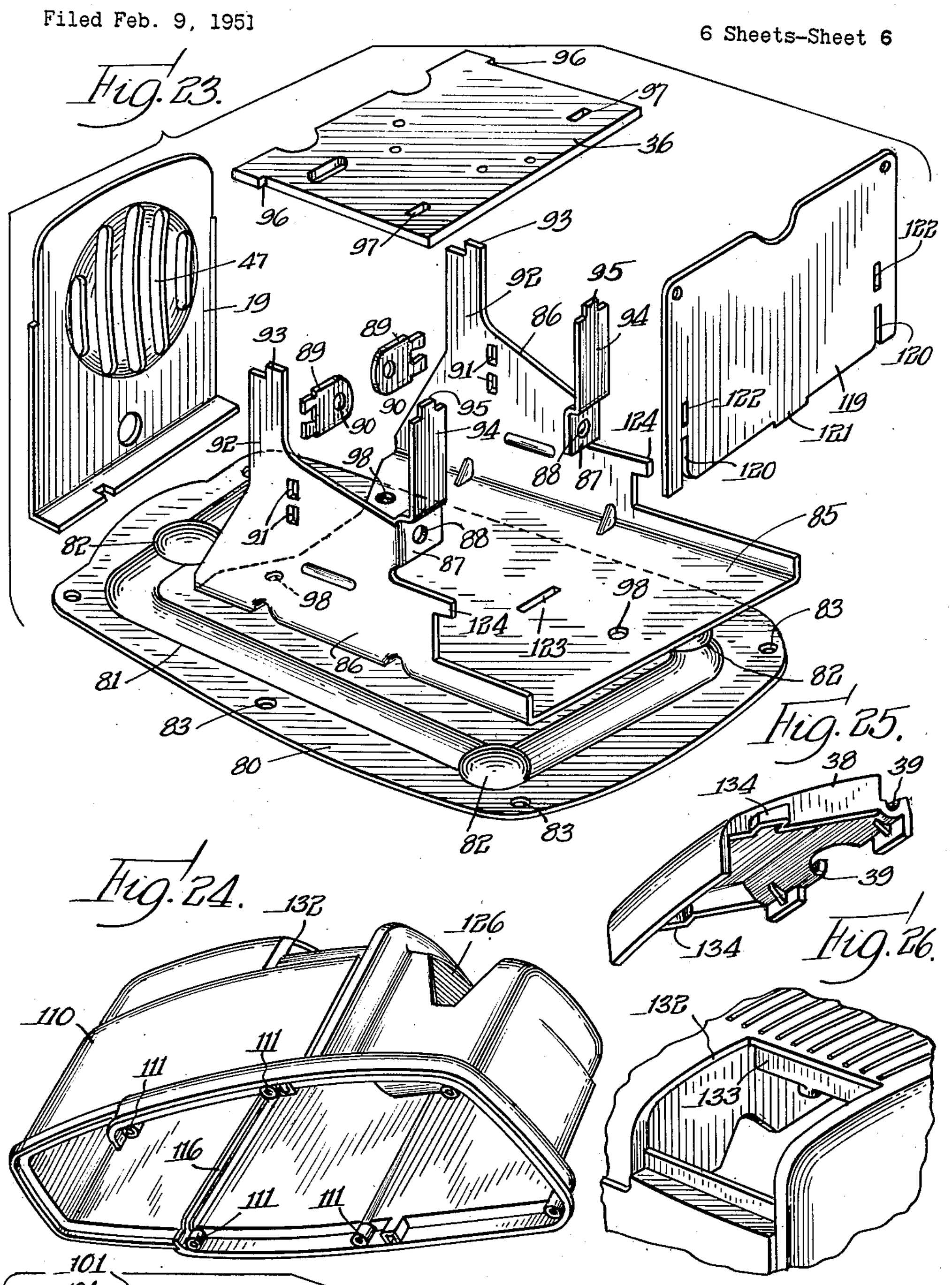
Figure 27:
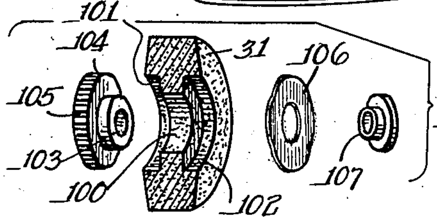

Fig. 5 showing one manner of mounting the abrasive wheel on the shaft;

Fig. 7 is a fragmentary exploded view showing a detail of the switch arrangement;

Fig. 8 is a transverse sectional view taken on the line 8—8 of Fig. 2, showing a switch arrangement;

Fig. 9 is a transverse sectional view taken on the line 9—9 of Fig. 2 showing the adjustable manner in which the knife guides are mounted and the manner of making the adjustment after the bottom plate assembly has been introduced into the housing. This figure also shows the baffle plate between the motor compartment and the abrasive wheel compartment;

Fig. 10 is a sectional view taken on the line 10—10 of Fig. 2, showing the baffle between the motor compartment and the cord compartment;

Fig. 11 is a fragmentary perspective view of the housing showing the knife guides and guide clips associated therewith;

Figs. 12 and 13 are views similar to Fig. 11 showing modified constructions of guide clips;

Fig. 14 is a perspective view of another form of the knife sharpener of this invention;

Fig. 15 is a rear elevational view of the knife sharpener shown in Fig. 14;

Fig. 16 is a plan view of the knife sharpener shown in Figs. 14 and 15;

Fig. 17 is a perspective view illustrating the guide surfaces and spring clips of the knife sharpener of Fig. 14;

Fig. 18 is an exploded view of the spring clip arrangement of Fig. 17;

Fig. 19 is a vertical sectional view taken substantially along the line 19—19 of Fig. 16;

Fig. 20 is a horizontal sectional view taken substantially along the line 20—20 of Fig. 19;

Fig. 21 is a vertical sectional view taken substantially along the line 21—21 of Fig. 19;

Fig. 22 is a vertical sectional view taken substantially along the line 22—22 of Fig. 19;

Fig. 23 is an exploded perspective view illustrating the motor frame and related parts utilized in the knife sharpener of Fig. 14;

Fig. 24 is a perspective view of the housing of the knife sharpener of Fig. 14;

Fig. 25 is a perspective view of the switch plate;

Fig. 26 is a perspective view of a portion of the housing showing the top opening for accommodating the switch plate; and Fig. 27 is an exploded perspective view of the abrasive wheel assembly utilized in the knife sharpener of Fig. 14.

One form of the knife sharpener of our invention, illustrated in Figs. 1 to 11, utilizes a housing 15 with a motor compartment 16, cord compartment 17, and abrasive wheel compartment 18 (note particularly Fig. 5). The three housing compartments referred to are formed by partitions or baffles 19 and 21 which extend into retaining grooves formed on the inside of the housing and are held in position by a two-part bottom plate 22. The housing is preferably die cast of relatively light weight but adequately strong metal to form a unitary finished body, but, of course, may be produced in other ways, or of any suitable material.

The motor is suitably of an induction type and, as shown, comprises a stack of laminations 23 to opposite sides of which are secured motor mounting plates 24, bottom portions of which are out-turned to form feet for attachment to the bottom plate by means of screws 26. A coil 27 is operably associated with the laminations 23, and a suitable rotor (not shown) is mounted on shaft 28 journalled in motor bearings 29. An abrasive wheel 31 is carried on one extending end of the shaft 28 and a cooling fan 32 on the opposite end. The cooling fan is lodged in the motor compartment, but the abrasive wheel is in the abrasive wheel compartment, the shaft 28 extending through the partition or baffle 21 as shown particularly in Figs. 4 and 5.

The knife sharpener of our invention is provided with a novel type of switch arrangement which utilizes a pair of resilient switch blades 33 and 34 carrying suitable contacts in engageable relation. The switch blades are secured to an insulating mounting plate 36 resting on fingers 37 which comprise upper extensions of the mounting plates 24. A second insulating plate 38 has a groove 39 (see Fig. 7) which engages a downwardly projecting rib 41 from the housing and is loosely held in position by a washer 42 and screw 43. The plate 38 fills a void in the housing and is shaped to comprise substantially a continuation of the housing in the space which it occupies. It has a lower rib 44 which engages the upper switch blade 34 and it is thus resiliently held at its uppermost position by such switch blade. The insulating plate 38 is held down by lateral ears thereon, projecting underneath the housing, so that it is not necessary to actually secure the plate 38 to the housing. By pressing downwardly on the insulating plate 38, the contacts carried by the switch blades may be closed and the motor caused to operate. As soon, however, as the insulating plate is released, the motor is de-energized and operation ceases.

It will be noted by particular reference to Fig. 5 that the cord compartment 17 is open at the bottom, and, as seen in Figs. 2 and 3, a portion of the housing at the lower portion of the cord compartment is symmetrically truncated to raise the entire compartment away from the base on which the housing otherwise rests. Thus, an extension cord may be loosely coiled or doubled over and pushed entirely up in the cord compartment. The cord extends from the cord compartment through an insulating grommet 46 in the baffle 19, whence its two leads are branched out in a conventional manner to place the coil 27 and switch blades 33 and 34 in series relation.

The fan 32 obviously operates during the entire time that the motor is running and is utilized to provide a continuous cooling means for the motor. Air is drawn in through apertures forming a grid 47 in the baffle plate 19 and is discharged through vents 48 forming a grill at the upper portion of the motor compartment. As shown particularly in Figs. 1 and 3, the vents 48 extend along a portion of the top and side of the housing in alignment with the upper insulating plate 38. The ribs 49, which appear in both Figures 1 and 3, do not provide openings but only a decorative effect, and it will, therefore, be noted that all of the air must enter the motor compartment by first passing through the bottom of the cord compartment and thence through the grid 47. This arrangement avoids any possibility of metal particles or abrasive wheel dust being drawn into the motor compartment and adversely affecting the useful life of the motor. To assure all of the incoming air coming in contact with the normally warmer parts of the motor, such as the motor winding or coil 27, an additional downwardly projecting baffle plate 51 is formed on the housing (Fig. 5).

We have previously referred to the desirability of preventing metal particles and abrasive dust from entering the motor compartment. To this end, the baffle 21 is formed imperforate except for the opening through which the shaft 28 extends, and a resilient sealing strip 52 is provided at its bottom edge. A felt washer 53 is disposed between the plate and contiguous bearing 29 to prevent dust from passing along the shaft. We have found, however, that when the identical construction shown in the drawings is employed there is a slight pressure in the motor compartment and dust will not enter even though there should be a relatively small unsealed opening such as would result from a hole for the passage of a motor shaft.

Figure 6:
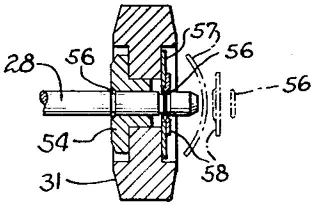

The fan 32 and abrasive wheel 31 may be secured to the shaft 28 in several ways and one very desirable arrangement is illustrated in Fig. 6. The abrasive wheel is engaged on one side by a collar 54 which is slightly bevelled to engage against a snap ring 56 in a groove provided on the shaft 28. At the opposite side, the abrasive wheel is engaged by a spring washer 57 which, in turn, is held by a retaining washer 58. There are two grooves in the shaft 28, either of which may receive a snap ring 56 for engaging the retaining washer 58 to hold the same in place against the spring washer 57. The parts are engineered so that, normally, the outer groove is used and if the curved washer is slightly weak or the wheel thickness is smaller than normal, then the ring can be pushed into the second groove to tighten the spring washer. While the construction provides only a friction engagement between the wheel and shaft, the actual torque is greater than that provided by the motor and there is an advantage in the construction in that there is nothing to become loose from sudden starting and stopping as might occur if the usual type of thread mounting were employed.

The abrasive wheel 31 partially projects through an opening in the top of the abrasive wheel compartment of the housing. A pair of knife guides 59 are mounted on opposite sides of this opening, above the wheel. The guides are suitably formed of relatively thin material by a drawing operation and have mounting brackets 61 secured to their rear faces by spot welding. Screws 62 extend through a contiguous ledge-like portion of the housing and are secured in threaded holes in the brackets. The openings in the housing through which the screws extend are in the nature of slots running parallel to the axis of the abrasive wheel so that the guides can be adjusted toward or away from the abrasive wheel and also adjusted angularly to some slight extent. It will be noted that the abrasive wheel is bevelled, and the guides 59 are so constructed and positioned as to cause the edge of the knife to engage across the flat portion of the bevel and at an angle desired to grind a suitable edge as required in a sharpening operation. In this respect, the guide faces are parallel to and inclined from the bevelled portions of the abrasive wheel.

The guides may be utilized without guide clips by merely laying the knife flat along the guide and drawing it from heel to tip along the abrasive wheel, first on one side and then on the other. We have found, however, that some advantage is obtained by the use of spring clips, formed of Phosphor bronze or the like, which are so positioned as to hold the knife in the desired position on the guides.

In the embodiment of the invention shown in Figs. 1–11, we show two separate clips 63 which are apertured near their lower ends to pass projections 64 formed on the casting comprising the housing. The spring clips are generally L-shaped but define an obtuse angle rather than a right angle as in the usual capital L. Two of the clips may be engaged by a single fastening screw 66 to maintain them in position, the projections 64 serving to prevent them from rotating out of position. These clips merely loosely engage the outside face of the knife and have some little effect in holding it against the flat face of the guides. The spring clips, however, are preferably quite resilient to accommodate knives of different thickness and to avoid too much friction to movement of the knife.

The guides 59, it will be recalled, are adjusted to a position to cause the knife to engage flatly against the bevel on each side of the abrasive wheel. The adjustment can be made accurately only after attachment of the base plate which carries the motor and remaining apparatus. To permit adjustment after assembly, we provide holes 67 in the bottom plate approximately in alignment with the screws 62 so that a screw driver can be inserted from below. The holes 67 are preferably closed by plugs 68 so designed that they may be snapped into or out of position for engagement or removal, respectively.

The bottom plate is attached against the flat bottom edge of the housing 15 by means of screws 69 (Fig. 8). There are preferably six of such screws as indicated by the holes provided in the bottom plate shown in Fig. 4, but Fig. 8 indicates only two of them. Fig. 8 also shows that a lug for receipt of the screws is cast integral with the housing on the inside thereof, and also that the edges of the bottom plate project beyond the housing. The assembly is completed by a rubber strip 71 of special cross section, the ends of which are attached to ears 72 bent up from the bottom plate. By anchoring the ends of the rubber strip and stretching it around the edge of the bottom plate and a lower protruding strip or bead 73 on the bottom of the housing, as shown particularly in Figs. 8–10, inclusive, a firm base is formed for the instrument and protection is afforded against possible marring or nicking of a surface on which the instrument is placed. The strip also seals the joint between the bottom plate and the housing, provides a pleasing appearance while permitting relatively inexpensive construction and contributes to the engineering of a suitable cord compartment as previously described.

In Fig. 12, we show a modification in which the spring clips 163 engaging the guides 159 are formed from a single stamping and a connecting web is so wedged in between contiguous portions of the casting comprising the housing that when the screw 166 is applied in position a firm anchorage of the spring clip stamping results.

In the embodiment of Fig. 13, the spring clips 263, held in place by a screw 266, are distinguished by the fact that they extend over a substantial portion of the guides 259 so that after the tip of the knife passes the rear portion of the sharpener in the usual sharpening operation, the tip will continue to be held entirely against the guides by the extended portions of the spring clips 263. In Fig. 13, a single stamping is used to form both spring clips as in Fig. 12 but obviously a two-part construction, not shown, similar to Fig. 11, could be used as well.

One of the very important features of our invention is an inter-relationship of the several parts which permits a knife to be effectively and rapidly sharpened, but prevents injury to the knife blade or person of the user by the abrasive wheel. The motor has adequate speed and torque characteristics for sharpening, but the torque-speed relationship is such that, given a particular diameter of abrasive wheel, the motor will stall before injury to a knife blade or body parts, such as the hands, can take place. We have determined that the force applied against the abrasive wheel required to stall the motor should be between 4 and 8 ounces. In other words, the relationship of the parts should be such that the motor will not stall unless a force of at least 4 ounces is applied against the abrasive wheel, but the force required to stall the motor should in no case be greater than 8 ounces. Preferably, also, the product of the diameter of the abrasive wheel in inches times the speed of the motor in revolutions per minute is between 2500 and 5100, it being understood, of course, that the diameter is taken at that portion of the wheel which is engaged by the knife.

In determining the relative values given hereinabove, there are several values and computations which were kept in mind. It has been determined experimentally that the ordinary steel knife cannot be sharpened effectively if the cutting velocity is less than about 500 feet per minute. On the other hand, if the cutting velocity is in excess of about 2000 feet per minute, burning will occur unless a coolant of some type is employed. In the ordinary home knife sharpener, the use of a coolant introduces an undesired complication, and a maximum velocity of 2000 feet per minute may be considered as controlling. The velocities given are lineal velocities and such lineal or cutting velocities are related to the speed of the wheel and the diameter at which the point of contact of a knife blade and abrasive wheel occurs. The equation for determining cutting velocity is $$V=3.14\times D\times N$$

where V is the cutting velocity in feet per minute, D is the diameter in feet of the point of knife contact on the abrasive wheel, and N is the speed of the wheel in revolutions per minute.

For several reasons, including economy, and the need of avoiding injury to the motor during stalling, a small induction motor is preferred. It is well known that for a given horsepower output, a higher speed will require a smaller frame size. There is also an advantage from an economy and design standpoint in employing a two-pole motor, having a top speed of 3600 revolutions per minute, but a full load speed of approximately 3000 revolutions per minute. While other motors may be used, a motor of this type offers very definite advantages from a design standpoint. Using a 3000 revolutions per minute motor, it follows from the figures that the diameter D of the abrasive wheel should lie between ⅝ inch and 2½ inches.

Another factor to consider so far as the possible damage to knives is concerned, is the rate at which metal is removed. It has been found that if the rate of metal removal does not exceed a permissible maximum the knife blade will not be nicked to an appreciable extent even if the knife sharpener is improperly used. The power required to remove metal by grinding bears a relationship to the rate of metal removal and for steel, using an abrasive wheel with 120 mesh grit, the breakdown horsepower of the motor should not exceed 0.01 H. P. The force required to stall a motor at a point located at a diameter D on the abrasive wheel is $$P=\frac{F\times D\times N}{126,000}$$

where P=power in horsepower, F is force in pounds, D is the diameter in inches, and N is the speed in revolutions per minute. Assuming, as we did, a motor developing 0.01 horsepower and converting the F values to ounces for three diameters D, the following results are obtained. When D is ⅝ inch, F is 10.7 ounces. When D is 1¼ inches, F is 5.4 ounces. When D is 2½ inches, F is 2.7 ounces.

The force with which a knife must be pressed against an abrasive wheel before stalling occurs, should not be too small, because otherwise too great skill is required to control this force and still keep the knife adequately in contact with the wheel. We have found that this force should not be less than about 4 ounces for ease of control and we have determined, therefore, that the relative values discussed hereinabove should be so combined that the stalling force is at least of the order of 4 ounces. We have also determined that if the force required to stall the motor is not in excess of approximately 8 ounces, injury is not likely to occur if the wheel is touched by the hands and sharpening of the knife can be accomplished even by the uninitiated without pitting or burning the edge. We have employed an abrasive wheel having a diameter of 1½ inches (but in which the average point of contact of the knife is at a periphery corresponding to approximately 1¼ inches) and have found by calculation and actual practice that such a wheel allows the application of a force up to 5.3 ounces before stalling occurs. This is accomplished, as previously noted, with a two pole hundredth horsepower induction motor having a full load speed of approximately 3000. For comparison, it may be noted that if the wheel is 1½ inches in diameter and the contact of the knife is at the maximum distance from the axis, the force required to stall the motor is 4.5 ounces. This provides adequate force for sharpening in the event the knife should engage the extreme periphery of the wheel. Contact of the fingers is apt to be at the extreme periphery and obviously the force required to stall the motor is sufficiently small so that injury is not likely to occur.

We pointed out hereinabove DN should be greater than 2500 and less than 5100. In the case of a motor having a speed of 3000 revolutions per minute and an abrasive wheel as described hereinabove, the value for DN is 3700. If in the calculation of DN only cutting velocities were to be considered, then the value for DN could lie between 1900 and 7600. When, however, the rate of metal removal and stalling characteristics of the motor are taken into consideration, the figures for DN will be found to lie between 2500 and 5100. It is, of course, understood that all of these calculations assume substantially a constant speed motor, that is to say, a motor which will stall when the speed is reduced markedly below the rated speed, as contrasted with a motor which has automatic compensating characteristics such as conventional series wound direct current motors.

Given a particular motor, the diameter of the abrasive wheel must be maintained within definite limits if the relationship discussed is to be maintained. For example, assuming a 0.01 horsepower two pole induction motor, the abrasive wheel must have a diameter between about 0.8 and 1.7 inches. If a four pole motor, of equivalent horsepower is employed, the diameter of the abrasive wheel may be as great as 2.5 inches. Theoretically, a very large abrasive wheel can be employed with a motor of greater weight and torque, but much lower speed, but practical aspects of design intervene. In actual practice we believe that the motor should be a two or four pole induction motor, of about .01 horsepower, with an abrasive wheel between .8 and 2.5 inches. In order that those skilled in the art may be fully advised, we wish to repeat at this time, that if the horsepower relation (speed or torque, or both) is modified, figures for abrasive wheel diameter must be revised.

The assembly and use of the knife sharpener of our invention are, in general, self-evident from the detailed description hereinabove. With the exception of the guides 59, spring clips 63 and insulating plate 38, all of the parts are mounted on the bottom plate 22. When the parts have been fully assembled on the bottom plate, such assembly is introduced into the housing, the screws 69 are secured in place, and the rubber strip 71 drawn around the bottom edge. The position of the guides 59 is checked and if adjustment is required, such adjustment is made by introducing a screw driver through the holes provided for the purpose.

To use the knife sharpener, it is only necessary to remove the cord from the cord compartment, plug the same into an outlet, and, standing in front of the knife sharpener, when it is in the position shown in Fig. 1, press the thumb or hand on the plate 38 to operate the motor. While the motor is running and the abrasive wheel is rotating (away from the observer in Fig. 1 and in a clockwise direction, looking at Fig. 9), the knife is drawn from heel to tip first across one side of the abrasive wheel and then across the other, using the guides provided for the purpose. The pressure is light and the sharpening action rapid and effective. In the event the knife is pressed too tightly against the abrasive wheel, the motor is stalled before the knife edge can be burned or pitted. If a knife is reasonably sharp, only a single pass on each side of the blade is necessary. Regardless of the number of passes, however, the abrasive action is uniform and there is no tendency to pitting or burning. In the event any portion of the body should come into contact with the exposed wheel, the motor is stalled without injury to the operator. The position of the switch is such that the knife sharpener can be held firmly with one hand at the same time it is operated, and release of the sharpener immediately stops the motor. This arrangement also further limits the possibility of injury, because both hands are kept busy and will normally be out of reach of the abrasive wheel. When the sharpening has been completed, the cord is folded and tucked into the cord compartment and the machine is ready for storage on a pantry shelf or the like.

Another form of the knife sharpener is illustrated in Figs. 14 to 27. Basically, this form of the knife sharpener is the same as that described above, although it differs in several detailed respects. Generally speaking, the knife sharpener of this form of the invention differs from the other form of the invention in that it utilizes a housing made of suitable moulded plastic, a single piece bottom plate, a different sealing strip arrangement, a different motor frame, a different manner in mounting the abrasive wheel, integral guide surfaces on the housing rather than separate adjustable guides, stop members for the spring clips and a different partition between the motor compartment and the abrasive wheel compartment, thereby forming a different manner of discharging cooling air from the motor compartment.

As shown, particularly in Fig. 23, the bottom plate 80 is made of a single piece of material and it has depressions 81 for strengthening purposes and depressions 82 which may form supporting feet for the bottom plate under certain circumstances.

The same motor as in the other form of the invention is utilized and it consists of stator laminations 23, a motor winding or coil 27, and a rotor (not shown) for operating a shaft 28, which is journalled in suitable bearings 29 carried by the stator laminations. The motor frame is more particularly illustrated in Fig. 23. It includes a frame member having a bottom 85 and sides 86. The sides are provided with ears 87 having holes 88. A pair of members 89 each have a hole 90 and a pair of tongues which are adapted to be received and secured in slots 91 in the sides 86 of the frame. Suitable rivets or the like passing through the holes 88 in the ears 87, the holes 90 in the members 89 and the holes in the stator laminations 23 securely mount the motor on the frame. The outer edges of the tongues engage the outer portions of the slots 91 to limit vertical movement of the stator in the frame. The slots 91 are somewhat wider than the thickness of the tongues and the inner edges of the tongues slope inwardly, so that when the tongues are twisted, a camming action takes place between the tongues and the slots. This camming action tightly secures the members 89 and hence the stator to the frame and also compensates for moderate variations in the stator thickness which might be caused by variations in the thickness of the various stator laminations. By this expedient stators of various thicknesses may be readily, simply and securely fastened in the frame.

The ears 87 are provided with extensions 94 having tongues 95 and the sides 86 are provided with extensions 92 having tongues 93. These extensions 92 and 94 carry the insulating plate 36, the tongues 93 cooperating with the shoulders 96 and the tongues 95 cooperating with slots 97 in the insulating plate 36. In this way the insulating plate 36 is securely carried by the motor frame. As in the previous form of the invention, the insulating plate 36 carries contact blades 33 and 34 forming the switch means for controlling operation of the motor. The bottom 85 of the motor frame is provided with holes 98 for receiving screws 99 extending through longitudinally extending slots 99' in the bottom plate 80 for securely fastening the motor frame to the bottom plate. Thus, the motor and the switch means are securely carried by the bottom plate.

One end of the motor shaft 28 carries a fan 32 and the other end carries the abrasive wheel 31. The particular manner of mounting the abrasive wheel on the motor shaft 28 is illustrated in detail in Figs. 20 and 27. Here the abrasive wheel 31, having beveled side portions, is provided with a central opening 100 and concentric circular recesses 101 and 102 in the sides of the wheel. A collar 103 having a flange 104 has the edge of the flange serrated, as indicated at 105. It is found that it is easier to maintain the concentricity of the larger circular recesses 101 and 102 than the central opening 100 in the abrasive wheel. Thus, by supporting the abrasive wheel 31 on the serrated edge 105 of the flange 104 of the collar 103, the abrasive wheel 31 may be more accurately concentrically mounted on the collar 103. In this respect, the abrasive wheel assembly of Figs. 20 and 27 is an improvement over that illustrated in Fig. 6. A crimped spring washer 106 is received in the circular recess 102 and it is backed by a retaining washer 107. The abrasive wheel assembly is secured onto the motor shaft 28 by snap rings 56 located in annular grooves in the motor shaft 28. The mounting of this grinding wheel assembly on the shaft is, therefore, the same as in the other form of the invention. The housing 110 may be formed of moulded plastic or other suitable material. It is open at its bottom and is provided with a plurality of bosses 111 for receiving screws 112 for the purpose of securing the housing 110 to the bottom plate 80. The bottom portion of the housing 110 is provided with an external bead 113 commensurate with the bottom plate and a strip of rubber, or the like, 114 is received over this external bead. The rubber strip 114 is a continuous strip and, in addition to extending around the housing, also extends underneath a portion of the housing in contact with the bottom plate 80. In this respect the rubber strip 114 is somewhat different than the rubber strip 71 of the other form of this invention. This rubber strip 114 operates to cover or seal the joint between the housing and the bottom plate and forms a base for the knife sharpener. If the rubber strip should be removed, then the knife sharpener is supported by the feet 82 of the base plate.

The interior of the housing 110 is provided with a groove 116 for receiving a partition 19 to separate the motor compartment 16 from the cord compartment 17. The portion of the housing 110 forming the cord compartment 17 overhangs the bottom plate 80 so as to provide free access to the cord compartment 17 from the bottom of the housing. As in the other form of the invention, the electric cord may be conveniently stored in the cord compartment when the sharpener is not in use. The electric cord extends through a suitable rubber grommet 46 in the partition 19 to the electric motor and the switch means therefor. The partition 19 is provided with apertures 47 to permit the fan 32 to circulate cooling air through the cord compartment 17 into the motor compartment 16 over the motor carried therein. The housing 110 is also provided with an internal baffle 117 for directing the circulated air over the winding or coil 27 of the motor.

A partial partition 119 is carried by the motor frame to form an abrasive wheel compartment 18 separated from, but communicating with, the motor compartment 16. In this respect, the partition 119 is provided with a pair of slots 120 for receiving the sides 86 of the motor frame, a tongue 121 insertable in a slot 123 in the bottom of the motor frame and a pair of slots 122 for receiving ears 124 on the motor frame. The ears are bent over after the partition member is set in place for the purpose of firmly securing the partition member in place. The air circulating through the motor compartment 16 discharges over the partition 119 into the abrasive wheel compartment 18 and this flow of air over the partition, in conjunction with the partition, operates effectively to prevent abrasive material from entering the motor compartment 16 from the abrasive wheel compartment 18.

The housing 110 is provided with a top opening 125 communicating with the abrasive wheel compartment 18 and the abrasive wheel 31 is disposed in this top opening. The housing 110 is integrally provided with guide surfaces 126 on opposite sides of the top opening 125, the guide surfaces 126 being parallel to, and inclined from, the beveled portions of the abrasive wheel 31. If the abrasive wheel should not be properly centered in the top opening when the housing is secured to the bottom plate, the motor and hence the abrasive wheel may be longitudinally adjusted along the bottom plate until proper centering is obtained. The longitudinal slots 99′ in the bottom plate permit this adjustment. Thus the guide surfaces 126 may be formed integrally on the housing 110 without the necessity of making them adjustable, as described in connection with the other form of the invention. The guide surfaces 126 accurately guide the knife into proper engagement with the beveled portions of the abrasive wheel 31 for accurately grinding both sides of the knife.

The housing 110 has a shelf 127 adjacent the top opening 125 for supporting spring clips 128 and stop members 129. These spring clips 128 and stop members 129 are illustrated in detail in Figs. 17 and 18 and they are secured to the shelf 127 by means of a screw 130. The shelf 127 is provided with shoulders for the purpose of preventing rotation of the spring clips and stop members. The spring clips 128 operate to hold the knife flat against the guide surfaces 126 and the stop members 129 limit the amount of bending movement of the spring clips 128 away from the guide surfaces 126. In this way distortion of the spring clips beyond their elastic limits is effectively prevented so that the spring clips will at all times remain operative for the purpose of maintaining the knife against the guide surfaces. The cooling air which is discharged from the motor compartment 16 into the abrasive wheel compartment 18 discharges through the top opening 125 about the abrasive wheel 31. Thus, the need for a separate grill for discharging the cooling air is eliminated.

The housing 110 is also provided with another top opening 132 above the switch blades 33 and 34. The housing adjacent this top opening is internally provided with a downwardly depending shoulder 133 for receiving the hooked end 39 of the switch plate 38. The switch plate is held in position on the shoulder 133 by means of a washer 42 and screw 43. The switch plate 38 has a downwardly depending shoulder 44 for engaging the upper switch blade 34 for the purpose of closing the switch means when the switch plate 38 is depressed about the shoulder 133. The edges of the switch plate 38 are provided with a pair of ears 134 which are received under the housing 110 to limit upward movement of the switch plate 38.

The speed and horsepower rating of the motor and the size of the abrasive wheel may be the same as that discussed above so that the manner of operation of the knife sharpener of this form of the invention is substantially the same as the manner of operation of the other form of the invention.

While, for purposes of illustration, several forms of this invention have been disclosed, other forms thereof may become apparent to those skilled in the art upon reference to this disclosure and, therefore, this invention is to be limited only by the scope of the appended claims.

What we claim as new and desire to protect by Letters Patent of the United States is:

1. A device for sharpening steel knives, applied to the device while held by the hand of an operator, at an optimum rate commensurate with the permissible maximum rate of removal of metal from knives while avoiding burning or nicking, comprising, in combination, an abrasive wheel having a substantially fine grit size and an annular knife grinding portion on at least one face thereof located at a radius not substantially less than 0.4 inch nor greater than 1.25 inches; means rotatably supporting said wheel; a substantially constant speed induction motor directly connected to said wheel to drive the same, said motor having a rate of rotation such that the lineal speed of any wheel in said radius range measured at the grinding portion thereof falls in the range 500 to 2000 feet per minute and a speed-torque characteristic such that the motor stalls when the load torque exceeds the pull-out torque of said motor, and being capable of developing power sufficient only to remove metal at a rate not in excess of the permissible maximum rate; and guide means for positioning the edge of a knife blade to be sharpened, as it is manually moved longitudinally, in contact with the grinding portion of said wheel, the radius at which such contact is made being such that when combined with the rate at which said wheel is rotated the power requirements to maintain rotation, upon application of the knife blade to said wheel with increasing pressure, exceed the power of said motor before the pressure of the knife blade against said wheel reaches a value such as would cause removal of metal from the knife blade at a rate in excess of the permissible maximum rate.

2. A device for sharpening steel knives, applied to the device while held by the hand of an operator, at an optimum rate commensurate with the permissible maximum rate of removal of metal from knives while avoiding burning or nicking, comprising, in combination, an abrasive wheel having a substantially fine grit size and an annular knife grinding portion on at least one face thereof located at a radius not substantially less than 0.4 inch nor greater than 1.25 inches; means rotatably supporting said wheel; a substantially constant speed induction motor directly connected to said wheel to drive the same, said motor having a rate of rotation such that the lineal speed of any wheel in said radius range measured at the grinding portion thereof falls in the range 500 to 2000 feet per minute and a speed-torque characteristic such that the motor stalls when the load torque exceeds the pull-out torque of said motor, and a breakdown horse power not substantially in excess of .01; and guide means for positioning the edge of a knife blade to be sharpened, as it is manually moved longitudinally, in contact with the grinding portion of said wheel, the radius at which such contact is made being such that when combined with the rate at which said wheel is rotating the power requirements to maintain rotation exceed the breakdown horsepower of said motor when pressure of the knife blade against said wheel is such as would cause removal of metal from the knife blade at a rate in excess of the permissible maximum rate.

3. A device for sharpening steel knives, applied to the device while held by the hand of an operator, at an optimum rate commensurate with the permissible maximum rate of removal of metal from knives while avoiding burning or nicking, comprising, in combination, an abrasive wheel having a substantially fine grit size and an annular knife grinding portion on each face thereof located at a radius not substantially less than 0.4 inch nor greater than 1.25 inches; said grinding portions presenting beveled surfaces converging toward the wheel periphery; means rotably supporting said wheel; a substantially constant speed induction motor directly connected to said wheel to drive the same, said motor having a rate of rotation such that the lineal speed of any wheel in said radius range measured at the grinding portion thereof falls in the range 500 to 2000 feet per minute and a speed-torque characteristic such that the motor stalls when the load torque exceeds the pull-out torque of said motor, and being capable of developing power sufficient only to remove metal at a rate not in excess of the permissible maximum rate; guide means for positioning the edge of a knife blade to be sharpened, as it is manually moved longitudinally in contact with the grinding portion of said wheel, comprising a rearwardly and upwardly diverging guide surface cooperatively disposed opposite each face of said wheel and substantially completely traversing said wheel, the bottom margins of said guide surfaces forming the boundaries of an aperture through which the upper portion of said wheel extends; and means for relatively axially adjusting said wheel and guide surfaces so as to maintain proper centering of said wheel between said guide surfaces; the radius at which contact is made between the edge of a knife blade to be sharpened and said wheel being such that when combined with the rate at which said wheel is rotated the power requirements to maintain rotation, upon application of the knife blade to said wheel with increasing pressure, exceed the power of said motor before the pressure of the knife blade against said wheel reaches a value such as would cause removal of metal from the knife blade at a rate resulting in burning or nicking of the knife blade.

4. A device for sharpening steel knives, applied to the device while held by the hand of an operator, at an optimum rate commensurate with the permissible maximum rate of removal of metal from knives while avoiding burning or nicking, comprising, in combination, an abrasive wheel having a substantially fine grit size and an annular knife grinding portion on each face thereof located at a radius not substantially less than 0.4 inch nor greater than 1.25 inches; said grinding portions presenting beveled surfaces converging toward the wheel periphery; means rotatably supporting said wheel; a substantially constant speed induction motor directly connected to said wheel to drive the same, said motor having a rate of rotation such that the lineal speed of any wheel in said radius range measured at the grinding portion thereof falls in the range 500 to 2000 feet per minute and a speed-torque characteristic such that the motor stalls when the load torque exceeds the pull-out torque of said motor, and being capable of developing power sufficient only to remove metal at a rate not in excess of the permissible maximum rate; guide means for positioning the edge of a knife blade to be sharpened, as it is manually moved longitudinally in contact with the grinding portion of said wheel, comprising a rearwardly and upwardly diverging guide surface cooperatively disposed opposite each face of said wheel and substantially completely traversing said wheel, the bottom margins of said guide surfaces forming the boundaries of an aperture through which the upper portion of said wheel extends, and spring means mounted adjacent each diverging guide surface at the wider end of said guide means and biased to press a knife blade against said guide surface; the radius at which contact is made between the edge of a knife blade to be sharpened and said wheel being such that when combined with the rate at which said wheel is rotated the power requirements to maintain rotation, upon application of the knife blade to said wheel with increasing pressure, exceed the power of said motor before the pressure of the knife blade against said wheel reaches a value such as would cause removal of metal from the knife blade at a rate resulting in burning or nicking of the knife blade.

References Cited in the file of this patent

UNITED STATES PATENTS

| | | |
|---|---|---|
| 557,051 | Cohen | Mar. 24, 1896 |
| 757,991 | Christmas | Apr. 19, 1904 |
| 909,707 | Sweet | Jan. 12, 1909 |
| 1,300,161 | Grain | Apr. 8, 1919 |
| 1,328,064 | Vasselli | Jan. 13, 1920 |
| 1,370,964 | Hansen | Mar. 8, 1921 |
| 1,388,882 | Paul | Aug. 30, 1921 |
| 1,445,676 | Furber | Feb. 20, 1923 |
| 1,461,604 | Douglass | July 10, 1923 |
| 1,497,513 | Kelley | June 10, 1924 |
| 1,535,611 | LeRoux | Apr. 28, 1925 |
| 1,650,573 | Searles | Nov. 22, 1927 |
| 1,726,571 | Kelley | Sept. 3, 1929 |
| 1,773,564 | Witzleben | Aug. 19, 1930 |
| 1,831,863 | Irwin | Nov. 17, 1931 |
| 1,871,674 | Ellithrope | Aug. 16, 1932 |
| 1,925,671 | Mansfield | Sept. 5, 1933 |
| 1,933,846 | Finnell | Nov. 7, 1933 |
| 1,955,967 | Leathers | Apr. 24, 1934 |
| 1,972,315 | Ramey | Sept. 4, 1934 |
| 2,001,799 | Seyfried | May 21, 1935 |
| 2,077,195 | Adams | Apr. 13, 1937 |
| 2,141,909 | Hauser | Dec. 27, 1938 |
| 2,189,474 | Russell | Feb. 6, 1940 |
| 2,200,173 | Indge | May 7, 1940 |
| 2,203,788 | Jenks | June 11, 1940 |
| 2,230,612 | Crise | Feb. 4, 1941 |
| 2,258,987 | Kochner | Oct. 14, 1941 |
| 2,318,764 | Dorris | May 11, 1943 |
| 2,433,512 | Gorn | Dec. 30, 1947 |
| 2,470,320 | Page | May 17, 1949 |
| 2,492,207 | Ballentine | Dec. 27, 1949 |
| 2,507,541 | Patterson | May 16, 1950 |
| 2,522,942 | Gillen | Sept. 19, 1950 |
| 2,566,809 | Risley et al. | Sept. 4, 1951 |
| 2,570,564 | Kublin | Oct. 9, 1951 |
| 2,585,637 | Dremel | Feb. 12, 1952 |
| 2,673,914 | Sundt | Mar. 30, 1954 |

FOREIGN PATENTS

| | | |
|---|---|---|
| 357,364 | Germany | Aug. 23, 1922 |
| 523,868 | Great Britain | July 24, 1940 |
| 530,625 | Great Britain | Dec. 17, 1940 |
| 534,234 | Great Britain | Mar. 3, 1941 |
| 543,094 | Great Britain | Feb. 10, 1942 |
| 981,178 | France | Jan. 10, 1951 |